United States Patent [19]
Hoff

[11] Patent Number: 4,633,978
[45] Date of Patent: Jan. 6, 1987

[54] BRAKE CALIPER INCLUDES MECHANICAL ACTUATOR WITH CAMMING DEVICE AND MANUAL WEAR COMPENSATOR

[75] Inventor: Stephen J. Hoff, Richmond, Ind.

[73] Assignee: Hoffco, Inc., Richmond, Ind.

[21] Appl. No.: 757,698

[22] Filed: Jul. 22, 1985

[51] Int. Cl.$^4$ .............................................. F16F 55/08
[52] U.S. Cl. ................... 188/71.7; 74/99 R;
188/72.3; 188/72.8; 188/196 M
[58] Field of Search ................ 188/72.6–72.9,
188/106 F, 24.11–24.22, 19, 21, 22, 26,
71.7–71.9, 71.1, 73.43, 79.5 K, 71.4, 71.3, 329,
330, 332, 338, 339, 196 V, 196 M, 196 BA, 72.3,
216; 74/99 R, 99 A

[56] References Cited

U.S. PATENT DOCUMENTS

| | | | |
|---|---|---|---|
| 3,155,195 | 11/1964 | Brawerman | 188/72.8 X |
| 3,267,752 | 8/1966 | Hauser-Bucher | 74/99 R |
| 3,354,732 | 11/1967 | Wickham | 74/99 R |
| 3,878,921 | 4/1975 | Kibler et al. | 188/72.7 X |
| 3,934,684 | 1/1976 | Evans | 188/72.7 X |
| 3,997,033 | 12/1976 | Bulmer | 188/72.7 |
| 4,029,179 | 6/1977 | Butz | 188/72.7 X |
| 4,102,440 | 7/1978 | Wood | 188/72.7 |

*Primary Examiner*—Douglas C. Butler
*Attorney, Agent, or Firm*—Barnes & Thornburg

[57] ABSTRACT

A brake caliper is provided for applying a braking force to a wheel, rotor, disc, or the like. The caliper includes a brake actuator, an actuator housing, a bearing for rotatably and slideably receiving the brake actuator in the actuator housing, and a ramp for displacing the brake actuator in an axial direction in relation to the actuator housing between an inactive position and a brake-actuating position in response to rotation of the brake actuator. At least one braking pad is actuable to apply a braking force in response to predetermined axial displacement of the brake actuator. The ramp includes at least one contoured camming surface inclined in a counterclockwise direction and at least one contoured camming surface inclined in a clockwise direction. Axial displacement of the brake actuator is accomplished by camming engagement between the brake actuator and one of the contoured camming surfaces formed in the ramp block. The brake actuator is rotatable by operation of a pull lever fixed to an outer end thereof. An adjustor is provided for moving the ramp block in the axial direction to move the brake-actuating position of the brake actuator correspondingly closer to the disc or other item to be braked to compensate for wear of the brake pad lining.

26 Claims, 8 Drawing Figures

BRAKE CALIPER INCLUDES MECHANICAL ACTUATOR WITH CAMMING DEVICE AND MANUAL WEAR COMPENSATOR

This invention relates to an improved caliper for a disc brake or other brake system, and particularly to a caliper having a brake actuator guided within a caliper housing on an internal ramp between an inactive position and a brake-actuating position and adjusted for actuation externally of the caliper housing.

Brake calipers having brake pads which are actuated by means of pressurized hydraulic fluid are known. Other examples of known brake calipers include sidepull or center-pull "bell-crank" calipers of the type used to slow down or stop movement of bicycle wheels. Such bell-crank assemblies typically include a pair of links which are pivoted into braking engagement with the bicycle wheel by retraction of a cable fixed to one or both of the pivotal links. Although hydraulic brake systems and bell-crank systems are appropriate for certain types of vehicles and bicycles, they are known to be inappropriate for use in small vehicles and other industrial applications. A powerful, compact, lever-actuated brake caliper unit capable of delivering high braking torque with minimum lever pull would avoid shortcomings of conventional brake caliper assemblies.

Many brake caliper assemblies are enclosed within protective caliper housings. In such assemblies, it is an inconvenient or otherwise time-consuming procedure to remove, disassemble, and either adjust or replace components (e.g. caliper levers, cables, brake pads, etc.) of the brake caliper assembly to maintain the brake pads at a proper brake-actuating position. A brake caliper having adjustment means which is operable from a point external to the caliper housing for selectively moving the inactive position of a brake pad toward the item (e.g. disc, rotor, or the like) to be braked to compensate for wear of the brake pad would be an improvement over conventional brake calipers.

One object of the present invention is to provide an efficient and reliable lever-actuated brake caliper capable of delivering high braking torque with minimum lever pull.

Another object of the present invention is to provide a versatile lever-actuated caliper that is converted easily for left-handed or right-handed operation.

Yet another object of the present invention is to provide an externally adjustable brake caliper that is adjustable by an operator to compensate for brake pad wear from a point outside of a brake caliper housing.

According to the present invention, a brake caliper for applying a braking force to a wheel, rotor, disc, or the like, includes a brake actuator, an actuator housing, bearing means for rotatably and slideably receiving the brake actuator in the actuator housing, and ramp means for displacing the brake actuator in an axial direction in relation to the actuator housing between an inactive position and a brake-actuating position in response to rotation of the brake actuator.

In preferred embodiments of the present invention, at least one braking pad is actuable to apply a braking force in response to predetermined axial displacement of the brake actuator. The ramp means includes a ramp block mounted in the actuator housing. The ramp block is formed to include at least one contoured camming surface inclined in a counterclockwise direction and at least one contoured camming surface inclined in a clockwise direction.

Axial displacement of the brake actuator is accomplished by camming engagement between the brake actuator and one of the contoured camming surfaces formed in the ramp block. The brake actuator is rotatable by operation of a pull lever fixed to an outer end thereof. The pull lever is biased yieldably to its normal position which corresponds to the inactive position of the brake actuator by a return spring. The brake actuator includes means for selectively riding on either the at least one counterclockwise contoured surface to displace axially the slideable brake actuator toward its brake-actuating position during rotation of the brake actuator in a counterclockwise direction or the at least one clockwise contoured surface to displace axially the slideable brake actuator during rotation of the brake actuator in a clockwise direction. Each contoured camming surface includes a positive stop for limiting rotation of the brake actuator.

The bearing means includes adjustment means for moving the ramp block in the axial direction to move the brake-actuating position of the brake actuator correspondingly closer to the disc or other item to be braked. This adjustment compensates for wear of the brake pad lining. The adjustment means preferably includes a hollow shaft rotatably mounted in the actuator housing. The brake actuator is received for rotational movement within the hollow shaft. Desirably, the hollow shaft threadedly engages the actuator housing to position an inner end in contact with the ramp block and an outer end outside of the actuator housing. The inner end of the hollow shaft operates to move the ramp block in the axial direction toward the disc to be braked during rotation of the outer end of the hollow shaft by a brake operator or maintenance personnel in a selected angular direction. Movement of the ramp block toward the disc varies the brake-actuating position of the brake actuator.

One feature of the present invention is provision of ramp means for displacing the brake actuator in an axial direction in relation to the actuator housing between an inactive position and a brake-actuating position in response to rotation of the brake actuator. The brake actuator advantageously cooperates with the ramp means to provide an uncomplicated sliding brake pad actuating system that is operable in response to rotation of a pull lever. The system is suitable for use on recreational vehicles, snowmobiles, go-carts, mini-bikes, garden tractors, three and four wheelers, and numerous other industrial applications. The foregoing system is contained easily in a protective housing and is operable to provide maximum brake pad force with minimum lever travel.

Another feature of the present invention is provision of ramp means including a ramp block having at least one contoured camming surface and a brake actuator including means for riding on the at least one contoured camming surface to displace axially the brake actuator during rotation thereof. The ramp block and the riding means advantageously cooperate to define an "inverted cam follower" assembly in which the "cam" (e.g. the contoured camming surfaces formed in the ramp block) is stationary and the "inverted cam follower" (e.g. the riding means on the brake actuator) moves in relation to the "cam" on the at least one camming surface of the ramp block. Thus, the present invention provides an efficient and reliable mechanically-actuated brake caliper unit. Another advantage of the foregoing feature is the ability to select a shape of each contoured surface to obtain, in effect, nonlinear axial movement of the brake actuator in response to rotation thereof. By comparison, such nonlinear response is not available to conventional axial/rotary motion converters such as a threaded bolt and nut assembly.

Yet another feature of the present invention is the formation on the ramp block of at least one contoured camming surface inclined in a counterclockwise direction and at least one contoured camming surface inclined in a clockwise direction. The feature advantageously permits an operator to select a desired angular direction for rotating the brake actuator to bring about axial displacement between its inactive and brake-actuating position. The brake pads are actuable in response to counterclockwise rotation of the pull lever attached to the outer brake actuator if the riding means is placed initially in camming engagement with the contoured camming surface inclined in the counterclockwise direction. Alternatively, the brake pads are actuable in response to the clockwise rotation of the pull lever attached to the outer end of the brake actuator if the riding means is placed initially in camming engagement with the contoured camming surface inclined in the clockwise direction. In preferred embodiments of the present invention, it is a simple operation to change the initial location of the riding means from one camming surface to another oppositely inclined camming surface. One advantage of such a feature is the ability to orient the manual pull lever so that the brake caliper of the present invention is adapted easily for mounting on either the left or right side of a vehicle or other apparatus.

Still another feature of the present invention is the formation of each contoured camming surface to include a positive stop for limiting rotation of the brake actuator. Such a positive stop advantageously allows the pull lever to be biased toward its normal position by a return spring without causing braking in the opposite direction of pull due to travel of the brake actuator on an adjacent contoured camming surface.

Additional objects, features, and advantages of the invention will become apparent to those skilled in the art upon consideration of the following detailed description of a preferred embodiment exemplifying the best mode of carrying out the invention as presently perceived. The detailed description particularly refers to the accompanying figures in which:

The brake caliper assembly 10 is actuable by an operator to apply a braking force to a rotatable disc 12. An actuator-side shell 14 and a static-side shell 16 are assembled using fastening means 18 to define a caliper housing for supporting the operating components of the brake caliper assembly 10 in proximity to the rotatable disc 12. Desirably, each shell 14 and 16 is diecast aluminum.

A static brake pad 20 is fixed rigidly to an interior wall 22 of the static-side shell 16 to lie in proximity to a first face 24 of the rotatable disc 12. The braking face of the static brake pad 20 is spaced from the first face 24 of the rotatable disc 12 to provide a small clearance therebetween when the brake caliper assembly 10 is inactive.

A floating brake pad 26 is movable within the actuator-side shell 14 to apply a braking force to a second face 28 of the rotatable disc 12 by operation of an actuator assembly 30. Preferably, the brake pads 20, 26 are molded of a non-asbestos automotive-type brake lining which exhibits very good friction qualities along with nonfade characteristics.

Figures 1, 2, 3:
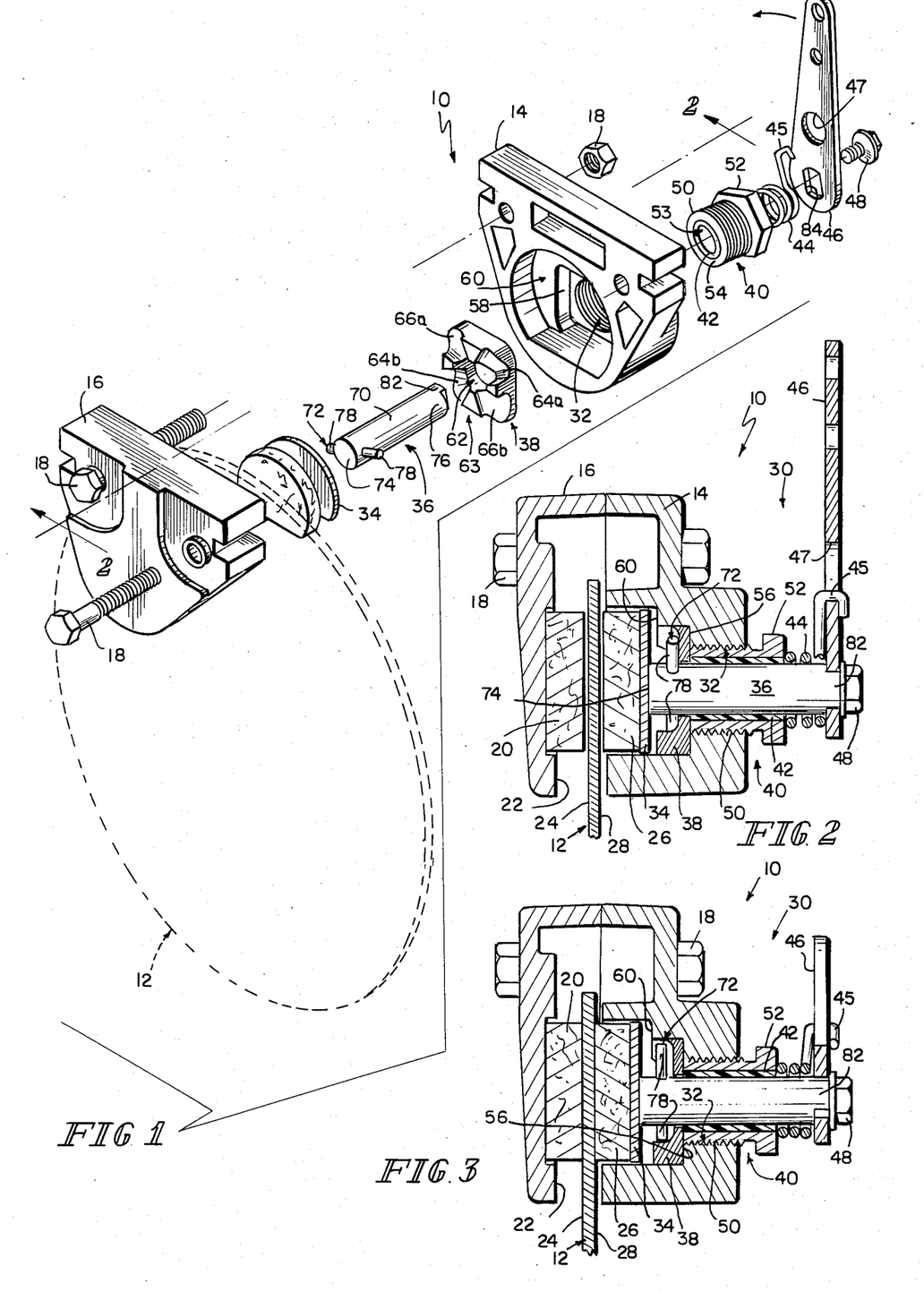
FIG. 1 is an exploded assembly view of a preferred embodiment of a disc brake caliper of the present invention.
FIG. 2 is a sectional view of the assembled brake caliper of FIG. 1 showing the brake actuator in its inactive position.
FIG. 3 is a view similar to the view shown in FIG. 2 showing the brake actuator after it has been displaced axially to its brake-actuating position in response to rotation of the brake actuator lever.

The actuator assembly 30 is mounted in a bore 32 formed in a central portion of the actuator-side shell 14 as shown best in FIGS. 1-3. The actuator assembly 30 includes a backup plate 34, a brake actuator 36, a ramp block 38, an adjusting barrel 40, a bushing 42, a return spring 44, a brake lever 46, and an assembly bolt 48. The bushing 42 is thin-walled and preferably formed of a plastics material. The adjusting barrel 40 includes an inner portion 50 formed to include external threads for threadedly engaging the actuator assembly bore 32 formed in the actuator-side shell 14. A hex-shaped tool grip is formed on an outer portion 52 of the adjusting barrel 40 to permit the adjusting barrel 40 to be rotated easily within bore 32 by means of a wrench or other tool. The adjusting barrel 40 further includes a longitudinal bore 53 for rotatably and slideably receiving the bushing 42 and the brake actuator 36, and an inner end 54 shaped to define an annular contact surface for engaging a flat rear face 56 of the ramp block 38. The spring 44 is desirably a combination compression/torsion spring. Spring 44 includes a torsion tang 45 that is insertable in aperture 47 of brake lever 46 to return torsionally the brake lever 46 to its normal orientation.

The ramp block 38 is mounted in a ramp block cavity 58 formed in an interior wall 60 of the actuator-side shell 14 as best shown in FIGS. 1-3. The ramp block 38 can be fabricated of powdered metal, sintered iron, nylon or other plastics material which is able to withstand a thrust load applied thereto during operation of the brake caliper.

The ramp block 38 is formed to include a central aperture 62 for rotatably and slideably receiving the brake actuator 36. The ramp block 38 is positioned in the cavity 58 so that the rear face 56 is presented toward the shell bore 32 for engagement with the annular contact surface 54 of the adjusting barrel 40 and the ramp block aperture 62 is alignable in coaxial relation to the longitudinal bore 53 formed in the adjusting barrel 40 when the actuator assembly 30 is mounted in the actuator-side shell 14 as shown in FIGS. 2 and 3.

The ramp block 38 also includes a front face 63 formed to include first and second pairs of contoured camming surfaces 64 and 66 as shown best in FIG. 1. Importantly, the first and second pairs of camming surfaces 64, 66 are inclined in opposite directions. The first pair of contoured camming surfaces 64a, 64b are inclined in relation to the rear face 56 in a counterclockwise direction and the second pair of contoured camming surfaces 66a, 66b are inclined in a clockwise direction. In the preferred embodiment, each camming surface 64, 66 defines a helical path; however, any of the camming surfaces 64, 66 can alternatively be defined by other types of regular or irregular convoluted paths characterized by spirals, ramps, steps, or the like, or combinations thereof, whether simple or intricate, without departing from the scope of the present invention.

The brake actuator 36 includes a shaft 70 and a dowel pin 72. The shaft is rotatably and slideably mounted in aperture 62 formed in the ramp block 38 and the longitudinal bore 53 formed in the adjusting barrel 40. Thus mounted, one end 74 of the brake actuator shaft 70 is positioned in the interior of the caliper housing 14, 16 and the other end 76 of the shaft 70 is positioned outside of the caliper housing 14, 16.

The dowel pin 72 is mounted to the interior end 74 to extend transversely in relation to the length of shaft 70 to define a pair of spaced apart inverted cam followers 78 as shown best in FIGS. 1-3. The inverted cam followers 78 are shaped to ride alternatively on one of the two pairs of contoured camming surfaces 64, 66 as illustrated best in FIGS. 4-8. The inverted cam follower 78 and the contoured camming surfaces 64, 66 cooperate to define an "inverted cam follower assembly" in which the camming surfaces 64, 66 are stationary relative to the inverted cam followers 78. Each inverted cam follower 78 moves on the camming surfaces 64, 66 in response to rotation of the brake actuator shaft 70. It will be understood that movement of the inverted cam follower 78 on a selected one of the camming surfaces 64, 66 operates to displace axially the brake actuator 36 between its inactive and brake-actuating positions. The novel inverted cam follower assembly of the present invention is responsible, in part, for providing a mechanically-actuated brake caliper that is both efficient and reliable.

Figure 5:
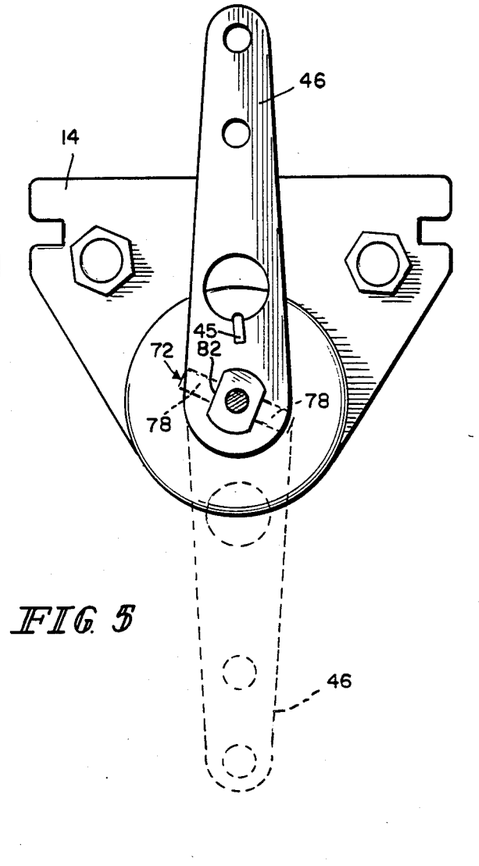
FIG. 5 is a view of the exterior of the caliper shown in FIG. 4.

The exterior end 76 of the brake actuator shaft 70 is formed to include a pair of flats which cooperate to define a stud 82 as shown best in FIGS. 1 and 5. The stud 82 extends along the longitudinal axis of shaft 70 to provide a mounting post for brake lever 76. Stud 82 is known colloquially as a "double-D" shaft. The brake lever 76 is formed to include an aperture 84 for receiving stud 82 so that the brake lever 76 is fixed to the brake actuator 36 at a point outside of the caliper housing 14, 16. Thus, the brake actuator 36 is rotatable in relation to the ramp block 38 by operating the exterior brake lever 76.

A preferred embodiment of a brake caliper constructed in accordance with the present invention is shown in a variety of configurations and operating positions in FIGS. 4-8. The preferred embodiment has a total of eight different initial lever positions in the counterclockwise direction of pull and another eight initial lever positions in the clockwise direction of pull for a total of 16 initial lever positions. Although each of the 16 positions is not illustrated individually in FIGS. 4-8 it will be apparent to those skilled in the art that 16 positions are in fact available. Selection of one of the 16 positions is accomplished by selecting: (1) one of the two available orientations of ramp block 38 within the ramp block cavity 58 formed in the actuator-side shell 14, (2) one of the two available pair of contoured camming surfaces 64, 66 for camming engagement with the dowel pin 72 of the brake actuator 36, and lastly (3) one of the four available orientations of brake lever 46 on the double-D stud 82 of the brake actuator shaft 70.

Figure 4:
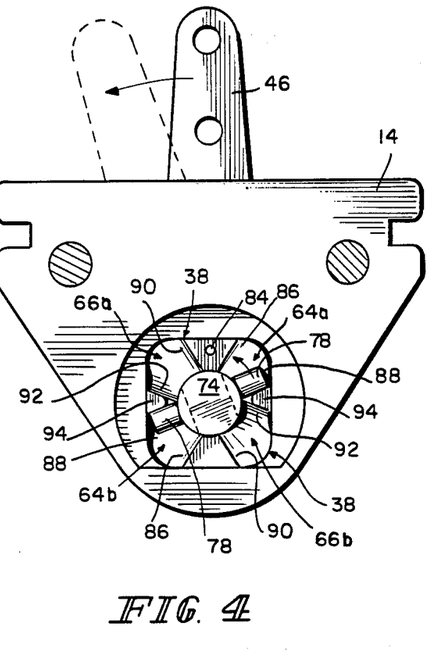
FIG. 4 is a view taken along lines 4—4 of FIG. 2 showing the brake lever in its 12 o'clock position with the actuator arranged to permit counterclockwise lever rotation.
Figure 6:
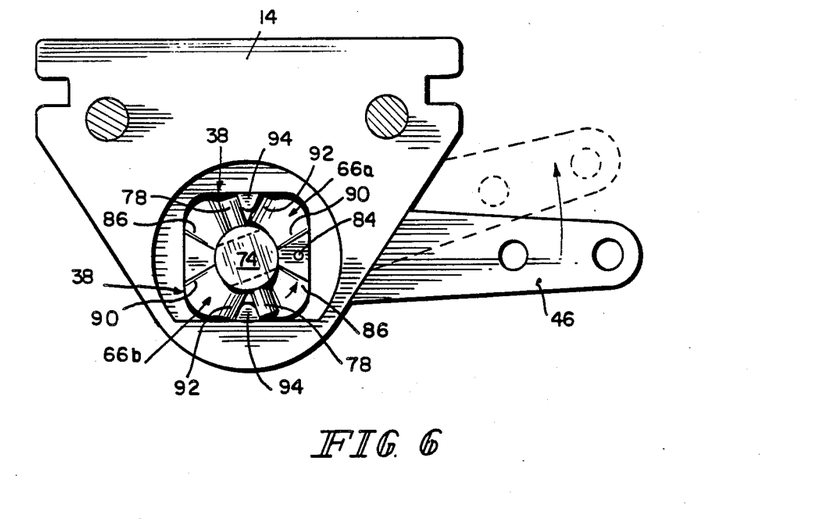
FIG. 6 is a view similar to the view shown in FIG. 4 showing the actuator arranged to permit counterclockwise lever rotation and the brake lever in its 3 o'clock position instead of its 12 o'clock position.
Figure 7:
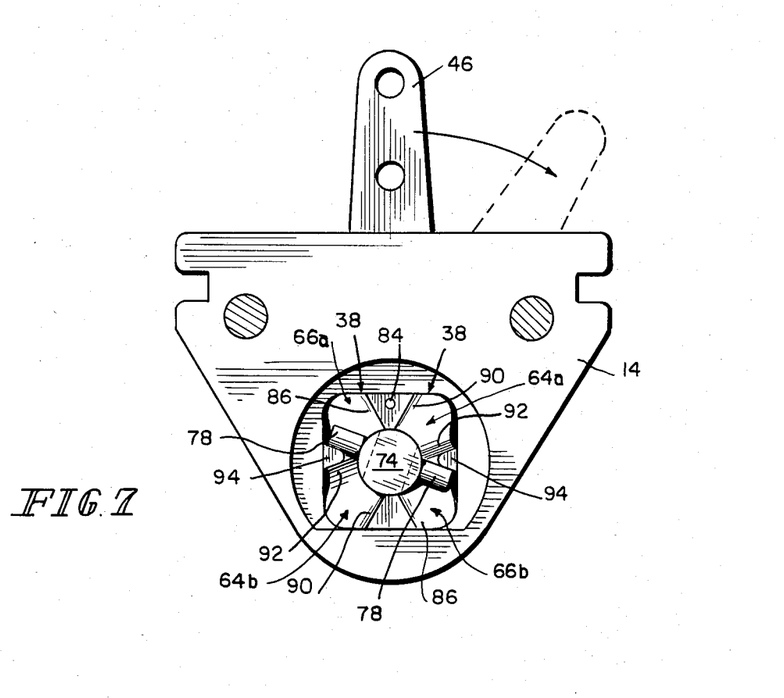
FIG. 7 is a view similar to the view shown in FIG. 4 showing the brake lever in its 12 o'clock position with the actuator arranged to permit clockwise lever rotation.
Figure 8:
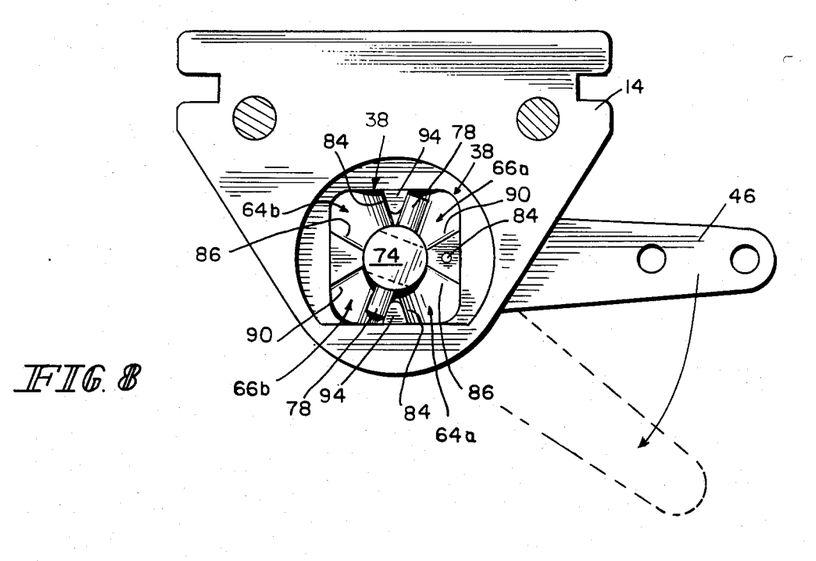
FIG. 8 is a view similar to the view shown in FIG. 6 showing the brake lever in its 3 o'clock position and the actuator arranged to permit clockwise lever rotation instead of counterclockwise lever rotation.

The two available orientations for ramp block 38 are illustrated in FIGS. 4 and 6 and also in FIGS. 7 and 8. Indentation mark 84 functions as a reference mark to aid in identifying the orientation of the ramp block 38. The ramp block 38 occupies a first orientation position when the indentation mark 84 is placed in a 12 o'clock position as shown in FIGS. 4 and 7 and, alternatively, a second orientation position when indentation mark 84 is in a 3 o'clock position as shown in FIGS. 6 and 8. It will be appreciated that a ramp block 38 oriented to position indentation mark 84 in a 6 o'clock position is the functional equivalent of the ramp block 38 in the 12 o'clock position. Also, a ramp block 38 oriented to position indentation mark 84 in a 9 o'clock position is the functional equivalent of the ramp block 38 in the 3 o'clock position. The foregoing functional relationship is obtained as a result of forming the pair of contoured camming surfaces 64, 66 in complementary relation as shown best in FIGS. 1 and 4 and described further below.

In a preferred embodiment, the counterclockwise camming surface 64a, 64b is inclined in the counterclockwise direction to define points of highest inclination 86 and points of lowest inclination 88. The clockwise camming surface 66 is inclined in a clockwise direction to define points of highest inclination 90 and points of lowest inclination 92. In particular, points of highest inclination 86, 90 are formed in close proximity to one another and the points of lowest inclination 88, 92 are formed in close proximity to one another as shown in FIGS. 1, 4, and 6-8. Thus, the contoured camming surfaces 64, 66 are arranged in complementary relation due to the relative inclination of adjacent camming surfaces. In addition, a positive stop 94 is formed at each of the points of lowest inclination 88, 92 so that return spring 44 can be used without causing braking in the opposite direction of pull.

The two available pairs of contoured camming surfaces 64a, 64b and 66a, 66b for camming engagement with the dowel pin 72 of the brake actuator 36 are illustrated in FIGS. 4, 6, 7, and 8. The dowel pins 72 ride on the pair of counterclockwise contoured camming surfaces 64a and 64b in the configurations shown in FIGS. 4 and 6. The principal difference between the configurations shown in FIGS. 4 and 6 is the 90 degree rotation of the ramp block 38 as indicated by the indentation mark 84. The dowel pins 72 ride on the pair of clockwise contoured camming surfaces 66a and 66b in the configurations shown in FIGS. 7 and 8. Again, the principal difference between the configurations shown in FIGS. 7 and 8 is the 90 degree rotation of the ramp block 38 as indicated by the indentation mark 84.

The four available orientations of brake lever 46 can be discerned from FIG. 5. Particularly, a first orientation is shown in solid lines while a second orientation is shown in broken lines. In addition, rotation of the lever 46 about its longitudinal axis from front to back (not shown) prior to installation on the Double-D stud 82 provides the remaining two orientations.

In operation, the brake lever 46 is pulled by an operator to rotate the brake actuator 36. In the configurations shown in FIGS. 4 and 5, the brake lever 46 is shown initially in a 12 o'clock position and a 3 o'clock position, respectively, for pivotal movement in a counterclockwise direction. In one alternative configuration shown in FIGS. 7 and 8, the brake lever 46 is shown initially in a 12 o'clock and 3 o'clock position, respectively, for pivotal movement in a clockwise direction. It will be appreciated that the preferred embodiment shown in FIGS. 1-8 offers a total of eight different lever positions in either direction of pull (clockwise/counterclockwise) for a total of 16 positions.

A complete mode of operation of caliper 10 is illustrated in FIGS. 2-4 and 6. In this embodiment, the caliper 10 is set up for counterclockwise actuation to accommodate either left-handed "pull" actuation or right-handed "push" actuation via lever handle 46. Initially, the brake actuator 36 is in its inactive position as shown in FIG. 2. In this position, the inverted cam follower portion 78 of dowel pin 72 engages counterclockwise camming surfaces 64a, b at the point 88 of lowest inclination and the brake pad 26 does not engage the second face 28 of disc 12. The caliper 10 is operated by rotation of lever 46 in a counterclockwise direction against return spring 44 from the initial position shown best in FIG. 2 (solid line position shown in each of FIGS. 4 and 6) to the final position shown best in FIG. 3 (phantom line positions shown in FIGS. 4 and 6). Corresponding counterclockwise rotation of brake actuator 36 causes follower portion 78 to be ramped along helical surfaces 64 to the point 86 of highest inclination. Such ramping acts to displace the rotating actuator 36 in an axial direction toward disc 12, thereby urging floating brake pad 26 into braking engagement with disc 12.

Another complete mode of operation of caliper 10 is illustrated in FIGS. 7 and 8. In this embodiment, the follower portion 78 has been positioned on clockwise camming surfaces 68a,b instead of counterclockwise camming surfaces 64a,b to permit clockwise actuation, thereby accommodating right-handed "pull" actuation or left-handed "push" actuation via lever handle 46. In this position, the inverted cam follower 78 of dowel pin 72 engages clockwise camming surfaces 66 at the point 92 of lowest inclination and the brake pad 26 does not engage the second face 28 of disc 12. The caliper 10 is operated by rotation of lever 46 in a clockwise direction against return spring 44 (not seen in FIGS. 7 and 8) from the initial position shown in solid lines in FIGS. 7 and 8 to the final position shown in phantom lines in FIGS. 7 and 8. Corresponding clockwise rotation of brake actuator 36 causes follower portion 78 to be ramped along helical surfaces 66 to the point 90 of highest inclination. Such ramping acts to displace the rotating actuator 36 in an axial direction toward disc 12, thereby urging floating brake pad 26 into braking engagement with the disc 12.

A brake caliper constructed in accordance with the teaching of the present invention can be adjusted for operation at any one of the 16 available positions by completing eight simple adjustment steps described below. The first step is to remove the bolt means 18 from the caliper housing 14, 16 to permit separation of shells 14 and 16. The second step is to unthread assembly bolt 48 to permit removal of the return spring 44 and the brake lever 46.

The third step involves selection of one of the two available orientations for ramp block 38. The ramp block should be mounted in a position shown in FIG. 4 if the brake lever 46 is to be mounted initially in either a 12, 11, 6, or 5 o'clock position. Alternatively, the ramp block 38 should be mounted in the position shown in FIG. 6 if the brake lever 46 is to be mounted initially in either of the 10, 9, 4, or 3 o'clock positions. The ramp block 38 can be oriented within the actuator-side shell 14 to provide the desired lever position by using the indentation 84 as a reference mark.

The fourth step involves selection of a lever rotation direction. The dowel pins 72 of the actuator shaft 36 should be positioned on the counterclockwise camming surfaces 64 as shown in FIGS. 4 and 6 to set the brake lever 46 for counterclockwise rotation. Alternatively, the dowel pins 72 can be positioned on contoured camming surfaces 66 to set up the brake lever 46 for clockwise rotation as shown best in FIGS. 7 and 8.

The fifth step involves reassembly of the brake lever 46. The brake lever 46 is formed to include a "D" shaped hole as shown best in FIG. 1. This specially shaped hole permits the brake lever 46 to be mounted on stud 82 of the brake actuator 36. It will be appreciated by those skilled in the art that the brake levers shown in FIG. 1 can now be positioned in any one of four different positions. The 12 o'clock and 6 o'clock positions are illustrated in FIG. 5. The two remaining positions are available by reversing the brake lever shown in FIG. 5 from front to back and reinstalling the lever on stud 82.

The sixth step involves installation of the return spring 44. After selection of an appropriate lever position, the lever 46 should be removed and return spring 44 should be installed as shown in FIGS. 1-3. Then the brake lever 46 should be reinstalled in the selected position. The seventh step involves installation of the floating brake pad 26 and the backup plate 34 as shown best in FIG. 1. The caliper brake of the present invention is now ready for installation on a vehicle or other machine.

Finally, the eighth step involves adjusting the caliper brake. When the brake actuator 36 is rotated to its inactive position as shown in FIG. 2, the adjusting barrel 40 should be rotated to move the floating brake pad 26 into engagement with the second face 28 of the rotatable disc 12 to cause brake lockup. At that point, the adjusting barrel 40 should be rotated a slight amount in the opposite direction to permit free rotation of the rotatable disc 12 without drag.

Although the invention has been described in detail with reference to certain preferred embodiments and specific examples, variations and modifications exist within the scope and spirit of the invention as described and defined in the following claims.

What is claimed is:

1. A brake caliper for applying a braking force to a rotating wheel, disc, or the like, the brake caliper comprising
a brake actuator,
an actuator housing,
bearing means for rotatably and slideably receiving the brake actuator in the actuator housing, and
ramp means for displacing the brake actuator in an axial direction in relation to the actuator housing between an inactive position and a brake-actuating position in response to rotation of the brake actuator, the ramp means including a ramp block mounted in the actuator housing, the ramp block including at least one contoured camming surface, the brake actuator including means for riding on the at least one contoured camming surface to displace axially the brake actuator during rotation thereof, and a shaft having a distal end, the ramp block being formed to include a shaft-receiving aperture to permit the distal end of the shaft to be positioned in proximity to the at least one contoured camming surface, and the riding means including a dowel pin mounted on the distal end of the received shaft to engage the at least one contoured camming surface so that the brake actuator is displaced in the axial direction selectively toward the inactive position or the brake-actuating position as the dowel pin rides on the at least one contoured camming surface during rotation of the brake actuator.

2. The brake caliper of claim 1, wherein each contoured camming surface defines an arcuate path for guiding the riding means.

3. The brake caliper of claim 1, wherein each contoured camming surface defines a helical path developed about the axis of rotation of said brake actuator for guiding the riding means.

4. The brake caliper of claim 1, wherein the at least one contoured camming surface is inclined to define a helical guiding path for guiding the dowel pin.

5. A brake caliper applying a braking force to a rotating wheel, disc, or the like, the brake caliper comprising
a brake actuator,
an actuator housing,
bearing means for rotatably and slideably receiving the brake actuator in the actuator housing, and
ramp means for displacing the brake actuator in an axial direction in relation to the actuator housing between an inactive position and a brake-actuating position in response to rotation of the brake actuator, the ramp means including a ramp block mounted in the actuator housing, the ramp block being formed to include at least one counterclockwise contoured surface and at least one clockwise contoured surface, the brake actuator including means for riding on one of the contoured surfaces, the at least one counterclockwise surface being inclined in the counterclockwise direction to define a first point of highest inclination and the at least one clockwise surface being inclined in the clockwise direction to define a section point of highest inclination, the first and second points of highest inclination being formed in the ramp block in close proximity one to another, the ramp block further including a stop member positioned along each contoured camming surface at the respective point of highest inclination to limit travel of the riding means at a selected position along the contoured camming surface corresponding to the brake-actuating position of the brake actuator.

6. The brake caliper of claim 5, wherein the brake actuator includes a shaft having a distal end, the ramp block is formed to include a shaft-receiving aperture to permit the distal end of the shaft to be positioned in proximity to the at least one contoured camming surface, and the riding means includes a dowel pin mounted on the distal end of the received shaft to engage the at least one contoured camming surface so that the brake actuator is displaced in the axial direction selectively toward the inactive position or the brake-actuating position as the dowel pin rides on the at least one contoured camming surface during rotation of the brake actuator.

7. The brake caliper of claim 6, wherein the at least one contoured camming surface is inclined to define a helical guiding path for guiding the dowel pin.

8. The brake caliper of claim 5, further comprising at least one braking pad actuable in response to a predetermined displacement of the brake actuator, and the bearing means including adjustment means for moving the ramp block in the axial direction to change the brake-actuating position of the brake actuator to compensate for braking pad wear.

9. A bidirectional brake caliper comprising
a mechanical brake actuator including a hand lever for manual brake actuation,
means for supporting the actuator for rotational and slideable movement between an inactive position and a brake-activating position, and
convertible camming means for sliding the actuator from its inactive position toward its brake-activating position in response to only a selected one of counterclockwise rotation of the actuator in relation to the supporting means and clockwise rotation of the actuator in relation to the supporting means, the camming means being convertible to permit rotation of the actuator in the other rotational direction so as to accommodate either left-handed or right-handed operation of the bidirectional caliper.

10. The caliper of claim 9, wherein the camming means includes
first ramp means, responsive to counterclockwise rotation of the actuator, for displacing the actuator toward its brake-activating position,
second ramp means, responsive to clockwise rotation of the actuator, for displacing the actuator toward its brake-activating position, and
stop means for separating the first and second ramp means to aid in preventing movement of the actuator on both of the first and second ramp means during a single braking activity involving rotation of the actuator in a selected angular direction and sliding movement of the actuator from its inactive position to its brake-activating position.

11. The caliper of claim 9, wherein the supporting means includes adjustment means for manually changing the brake-activating position of the actuator to compensate for actuator wear.

12. A bidirectional brake caliper assembly for applying a braking force to a rotating wheel, disc, or the like, the assembly comprising
a brake actuator including a hand lever for manual brake actuation,
an actuator housing,
bearing means for rotatably and slidably receiving the brake actuator in the actuator housing, the brake actuator being positioned in the housing to project the hand lever outside of the housing, and
a ramp block including the first ramp means for displacing the brake actuator in an axial direction in relation to the actuator housing from an inactive position toward a brake-activating position in response to counterclockwise rotation of the brake actuator and separate second ramp means for displacing the brake actuator in said axial direction in response to clockwise rotation of the brake actuator, the brake actuator including means for selectively riding on one of the first and second ramp means so that the assembly is manually convertible to permit either counterclockwise actuation and accommodate right-handed caliper actuation or clockwise actuation and accommodate left-handed caliper actuation by positioning the riding means of the brake actuator on a selected one of the first and second ramp means.

13. The brake caliper of claim 12, wherein each of the first and second ramp means includes at least one contoured camming surface defining an arcuate path for guiding the riding means.

14. The brake caliper of claim 12, wherein each of the first and second ramp means includes at least one contoured camming surface defining a helical path developed about the axis of rotation of said brake actuator for guiding the riding means.

15. The brake caliper of claim 12, wherein each of the first and second ramp means includes at least one contoured camming surface, the brake actuator includes a shaft having a proximal end and a distal end, the hand lever is fixed to the proximal end, the ramp block is formed to include a shaft-receiving aperture to permit the distal end of the shaft to be positioned in proximity to the at least one contoured camming surface, and the riding means includes a dowel pin mounted on the distal end of the received shaft to engage the at least one contoured camming surface of the selected one of the separate first and second ramp means so that the brake actuator is displaced in the axial direction selectively toward the inactive position or the brake-actuating position as the dowel pin rides on the at least one contoured camming surface during rotation of the brake actuator.

16. The brake caliper of claim 15, wherein the at least one contoured camming surface is inclined to define a helical guiding path for guiding the dowel pin.

17. The brake caliper of claim 12, further comprising at least one braking pad actuable in response to predetermined displacement of the brake actuator, and the bearing means including adjustment means for moving the ramp block in the axial direction to change the brake-actuating position of the brake actuator to compensate for braking pad wear.

18. The brake caliper of claim 12, wherein the bearing means includes a hollow shaft for the reception of the brake actuator, the hollow shaft being rotatably mounted in the actuator housing, and the hollow shaft threadedly engages the actuator housing to position an inner end of the hollow shaft in touching relation to the ramp means so that the inner end of the hollow shaft moves the ramp means in the axial direction toward the brake-actuating position during rotation of the hollow shaft in a selected angular direction.

19. The brake caliper of claim 18, wherein the hollow shaft includes an outer end positioned outside of the actuator housing when the brake actuator is in its inactive position to permit a user to rotate the threaded hollow shaft in relation to the actuator housing from a point external to the actuator housing.

20. The brake caliper of claim 12, wherein the first ramp means includes at least one counterclockwise surface inclined in the counterclockwise direction to define a first point of lowest inclination and the second ramp means includes at least one clockwise surface inclined in the clockwise direction to define a second point of lowest inclination, the first and second points of lowest inclination being formed in the ramp block in close proximity one to another, the ramp block further including a stop member situated between said first and second points.

21. The brake caliper of claim 12, wherein the first ramp means includes at least one counterclockwise surface inclined in the counterclockwise direction to define a first point of highest inclination and the second ramp means includes at least one clockwise surface inclined in the clockwise direction to define a second point of highest inclination, the first and second points of highest inclinations are formed in the ramp block in close proximity one to another, and the ramp block further includes a stop member positioned along each contoured camming surface at the respective point of highest inclination to limit travel of the riding means at a selected position along the contoured camming surface corresponding to the brake-actuating position of the brake actuator.

22. A bidirectional brake caliper for applying a braking force to a rotating wheel, disc, or the like, the brake caliper comprising
a brake actuator,
an actuator housing,
bearing means for rotatably and slidably receiving the brake actuator in the actuator housing, and
ramp means for displacing the brake actuator in an axial direction in relation to the actuator housing between an inactive position and a brake-actuating position in response to rotation of the brake actuator, the ramp means including a ramp block mounted in the actuator housing, the ramp block being formed to include at least one counterclockwise contoured surface, at least one clockwise contoured surface, and stop means for separating adjacent contoured surface, the brake actuator including means for riding on one of the counterclockwise and clockwise contoured surfaces to displace the brake actuator in the axial direction during rotation thereof, the stop means being configured to block movement of the riding means between adjacent counterclockwise and clockwise contoured surfaces during operation of the brake actuator so that the brake actuator is rotatable in a selected counterclockwise or clockwise direction to operate the caliper by positioning the riding means on a corresponding one of the counterclockwise and clockwise surfaces.

23. The brake caliper of claim 22, wherein the at least one counterclockwise surface is inclined in the counterclockwise direction to define a first point of lowest inclination and the at least one clockwise surface is inclined in the clockwise direction to define a second point of lowest inclination, the first and second points of lowest inclination being formed in the ramp block in close proximity one to another, and the stop means includes a positive stop situated intermediate the first and second points of lowest inclination to limit travel of the riding means along the contoured camming surface at a selected position corresponding to the inactive position of the brake actuator.

24. The brake caliper of claim 22, wherein the at least one counterclockwise surface is inclined in the counterclockwise direction to define a first point of highest inclination and the at least one clockwise surface is inclined in the clockwise direction to define a second point of highest inclination, the first and second points of highest inclination being formed in the ramp block in close proximity one to another.

25. The brake caliper of claim 24, wherein the ramp block further includes a stop member positioned along each contoured camming surface at the respective point of highest inclination to limit travel of the riding means at a selected position along the contoured camming surface corresponding to the brake-actuating position of the brake actuator.

26. A brake caliper for applying a braking force to a rotating wheel, a disc, or the like, the brake caliper comprising at least one brake pad,
a brake actuator,
an actuator housing,
bearing means for rotatably and slidably receiving the brake actuator in the actuator housing, and
ramp means for displacing the brake actuator in the axial direction in relation to the actuator housing between an inactive position and a brake-actuating position in response to rotation of the brake actuator, the ramp means including a ramp block mounted in the actuator housing for sliding movement in said axial direction, the ramp block including at least one contoured camming surface,
the brake actuator including means for riding on the at least one contoured camming surface to displace the brake actuator in said axial direction during rotation thereof, the at least one braking pad being actuated in response to a predetermined displacement of the brake actuator,
the bearing means including adjustment means for changing the brake-actuating position of the brake actuator to compensate for braking pad wear, the adjustment means including a barrel surrounding the brake actuator, the barrel including one end engaging the ramp block and another end projecting outwardly from the housing, the barrel being manually movable to urge the slidable ramp block and the riding means in the axial direction so that the brake actuator is displaced an amount sufficient to actuate the at least one braking pad, thereby permitting external actuation of the brake caliper via the adjustment means.

* * * * *